United States Patent
Hashemi

(10) Patent No.: US 6,981,171 B2
(45) Date of Patent: Dec. 27, 2005

(54) DATA STORAGE ARRAY EMPLOYING BLOCK VERIFICATION INFORMATION TO INVOKE INITIALIZATION PROCEDURES

(75) Inventor: Ebrahim Hashemi, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 491 days.

(21) Appl. No.: 09/875,241

(22) Filed: Jun. 5, 2001

(65) Prior Publication Data

US 2002/0184556 A1 Dec. 5, 2002

(51) Int. Cl.$^7$ ............................................... G06F 11/00
(52) U.S. Cl. ................................. 714/5; 714/6; 711/114
(58) Field of Search ............................ 714/5, 6, 42, 54; 711/114

(56) References Cited

U.S. PATENT DOCUMENTS

| | | | |
|---|---|---|---|
| 5,109,385 A | 4/1992 | Karp et al. | |
| 5,172,381 A | 12/1992 | Karp et al. | |
| 5,671,349 A | 9/1997 | Hashemi et al. | |
| 5,737,745 A * | 4/1998 | Matsumoto et al. | 711/114 |
| 5,774,641 A * | 6/1998 | Islam et al. | 714/6 |
| 5,774,643 A | 6/1998 | Lubbers et al. | |
| 5,787,463 A | 7/1998 | Gajjar | |
| 5,953,352 A | 9/1999 | Meyer | |
| 6,023,780 A * | 2/2000 | Iwatani | 714/770 |
| 6,061,822 A | 5/2000 | Meyer | |
| 6,151,659 A * | 11/2000 | Solomon et al. | 711/114 |
| 6,425,053 B1 * | 7/2002 | Considine et al. | 711/114 |
| 6,535,994 B1 * | 3/2003 | Kedem | 714/6 |
| 6,651,137 B2 * | 11/2003 | Baek et al. | 711/114 |
| 2002/0161972 A1 * | 10/2002 | Talagala et al. | 711/114 |
| 2002/0169995 A1 * | 11/2002 | Archibald et al. | 714/6 |

OTHER PUBLICATIONS

Parity Preservation for Redundant Array of Independent Direct Access Storage Device. Mar. 1993.
Logical Block Address Checking in a Disk Array. Jul. 1996.

* cited by examiner

Primary Examiner—Robert Beausoliel
Assistant Examiner—Yolanda L Wilson
(74) Attorney, Agent, or Firm—Meyertons Hood Kivlin Kowert & Goetzel, P.C.; B. Noël Kivlin

(57) ABSTRACT

A data storage array employing block verification information to invoke initialization procedures. In one embodiment, a data storage subsystem includes a plurality of storage devices configured in an array and a storage controller coupled to the storage devices. The storage controller is configured to store data in the form of stripes where each stripe includes a plurality of data blocks stored across the plurality of storage devices. Each of the data blocks is associated with block verification information. Upon certain write operations, the storage controller is configured to initialize a given stripe in response to detecting a mismatch in the block verification information in at least one data block of the given stripe. In one particular implementation, the block verification contained in each of the data blocks includes a logical block address and/or a cyclic redundancy code.

45 Claims, 7 Drawing Sheets

DATA STORAGE ARRAY EMPLOYING BLOCK VERIFICATION INFORMATION TO INVOKE INITIALIZATION PROCEDURES

BACKGROUND OF THE INVENTION

1. Field of the Invention

This invention relates to computer data storage systems, and more particularly, to Redundant Array of Inexpensive Disks (RAID) systems and to initialization procedures in storage arrays.

2. Description of the Related Art

A continuing desire exists in the computer industry to consistently improve the performance and reliability of computer systems over time. For the most part, the desire for improved performance has been achieved for the processing or microprocessor components of computer systems. Microprocessor performance has steadily improved over the years. However, the performance of the processors in a computer system is only one consideration associated with the overall performance of the computer system. For example, the computer memory system must be able to keep up with the demands of the processor or the processor will become stalled waiting for data from the memory system. Generally computer memory systems have been able to keep up with processor performance through increased capacities, lower access times, new memory architectures, caching, interleaving and other techniques.

Another critical aspect associated with the overall performance of a computer system is the I/O system performance. For many applications, the performance of the mass storage system or disk storage system serves a significant role in the I/O system performance. For example, when an application requires access to more data or information than it has room for in allocated system memory, the data may be paged in/out of disk storage to/from the system memory. Typically the computer system's operating system copies a certain number of pages from the disk storage system to main memory. When a program needs a page that is not in main memory, the operating system copies another page back to the disk system and copies the required page into main memory. Processing may be stalled while the program is waiting for the page to be copied. If storage system performance does not keep pace with performance gains in other components of a computer system, then delays in storage system accesses may overshadow performance gains elsewhere. Computer storage systems must also reliably store data. Many computer applications cannot tolerate data storage errors. Even if data errors are recoverable, data recovery operations may have a negative impact on performance.

One technique for increasing the capacity, performance and reliability of disk storage systems is to employ an array of storage devices. An example of such an array of storage devices is a Redundant Array of Independent (or Inexpensive) Disks (RAID). A RAID system improves storage performance by providing parallel data paths to read and write information over an array of disks. By reading and writing multiple disks simultaneously, the storage system performance may be greatly improved. For example, an array of four disks that can be read and written simultaneously may provide a data rate almost four times that of a single disk. However, using arrays of multiple disks comes with the disadvantage of increasing failure rates. In the example of a four disk array above, the mean time between failure (MTBF) for the array will be one-fourth that of a single disk. It is not uncommon for storage device arrays to include many more than four disks, shortening the mean time between failure from years to months or even weeks. Some RAID systems address this reliability issue by employing parity or redundancy so that data lost from a device failure may be recovered.

One common RAID technique or algorithm is referred to as RAID 0. RAID 0 is an example of a RAID algorithm used to improve performance by attempting to balance the storage system load over as many of the disks as possible. RAID 0 implements a striped disk array in which data is broken down into blocks and each block is written to a separate disk drive. Thus, this technique may be referred to as striping. Typically, I/O performance is improved by spreading the I/O load across multiple drives since blocks of data will not be concentrated on any one particular drive. However, a disadvantage of RAID 0 systems is that they do not provide for any data redundancy and are thus not fault tolerant.

RAID 5 is an example of a RAID algorithm that provides some fault tolerance and load balancing. FIG. 1 illustrates a RAID 5 system in which both data and parity information (or "parity data") are striped across a plurality of storage devices forming an array. A data volume is divided into segments or blocks called stripe units. Stripe units are mapped consecutively on a set of physical devices for parallel access purposes. Generally speaking, in order to recover from physical device failures, functions (redundancies) of a group of stripe units are generated and mapped to distinct physical devices. In the illustrated system, this redundancy is in the form of the parity data. Each member of the group is mapped to a different physical device in order to make the recovery possible. The set of functions typically form a set of equations with a unique solution. Most common implementations use a single even parity function which can recover from any single device failure in the group. Some implementations use two functions, generally referred to as P and Q parities, to recover from any two device failures in the group. This extension to RAID 5 is sometimes referred to as RAID 6.

In RAID 5 systems (and similar systems that employ data striping with redundancy), during write operations if the entire data involved in a redundancy group is to be written (i.e., all of the stripe units of the given stripe), then the parity data can be readily generated. However, normally a write operation involves only part of the data involved in the group. In this case, typically depending on the size of the data to be updated, the parity data may be updated in either of two ways. The parity data may be updated by reading the remaining unchanged data blocks and computing new parity data in conjunction with the new data to be written. This scheme is referred to as a "reconstruct write" scheme. The parity data may alternatively be updated by reading the old data corresponding to the data to be written along with the old parity data and using this information in conjunction with the data to be written to generate the new priority data. This scheme is referred to as a "read-modify-write" scheme. This scheme is based on the fact that the functions used (e.g., parity) are generally idempotent binary functions. In either case, the additional read and write operations can limit performance. This limitation is known as a small-write penalty problem.

The read-modify-write scheme is efficient for "small writes" and is commonly used. However, it requires that the redundancies be initially consistent with the data in the group. To achieve this initial consistency, after the definition of a RAID 5 device, the device is typically initialized. This involves writing the entire set with a consistent pattern (usually with zeros if even parity is used for redundancy).

This is a time-consuming operation, and the storage array typically cannot be utilized for normal accesses during such initialization procedures.

SUMMARY OF THE INVENTION

A data storage array employing block verification information to invoke initialization procedures is provided. In one embodiment, a data storage subsystem includes a plurality of storage devices configured in an array and a storage controller coupled to the storage devices. The storage controller is configured to store data in the form of stripes where each stripe includes a plurality of data blocks stored across the plurality of storage devices. Each of the data blocks is associated with block verification information. Upon certain write operations, the storage controller is configured to initialize a given stripe in response to detecting a mismatch in the block verification information in at least one data block of the given stripe.

In one particular implementation, the block verification may be contained in each of the data blocks and may include a logical block address and/or a cyclic redundancy code. When the storage controller performs a read-modify-write operation, the storage controller may read the old data block corresponding to a block being updated. The storage controller may further detect the logical block address and cyclic redundancy check code of the old data block to determine whether the associated stripe has been initialized. This may be achieved by determining that a mismatch exists in the logical block address and/or the cyclic redundancy check code of the old data block. A mismatch in the logical block address occurs when the value in an LBA field of the old data block read from disk does not match the logical block address expected by the storage controller (i.e., the logical block address value corresponding to the location specified in the read request). Similarly, a mismatch in the cyclic redundancy check code occurs when the value in a CRC field of the old data block does not properly reflect the data (and logical block address, if covered) stored in the data block, or the portion thereof that the cyclic redundancy check code is intended to cover. In the event a mismatch exists, the storage controller may be configured to initialize the stripe by reading the data blocks of the remaining stripe units forming the stripe, computing a consistent redundancy data block(s) (e.g., parity data block) for the stripe, and storing the new data block and the redundancy data block(s) to the array of storage devices.

By using the block verification information associated with the data blocks, complete initialization of the array of storage devices may not be required prior to utilization of the array for normal storage and retrieval operations. Instead, initialization of various stripes associated with the array of storage devices may occur at various times throughout normal operation of the storage subsystem to thereby amortize the initialization process.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
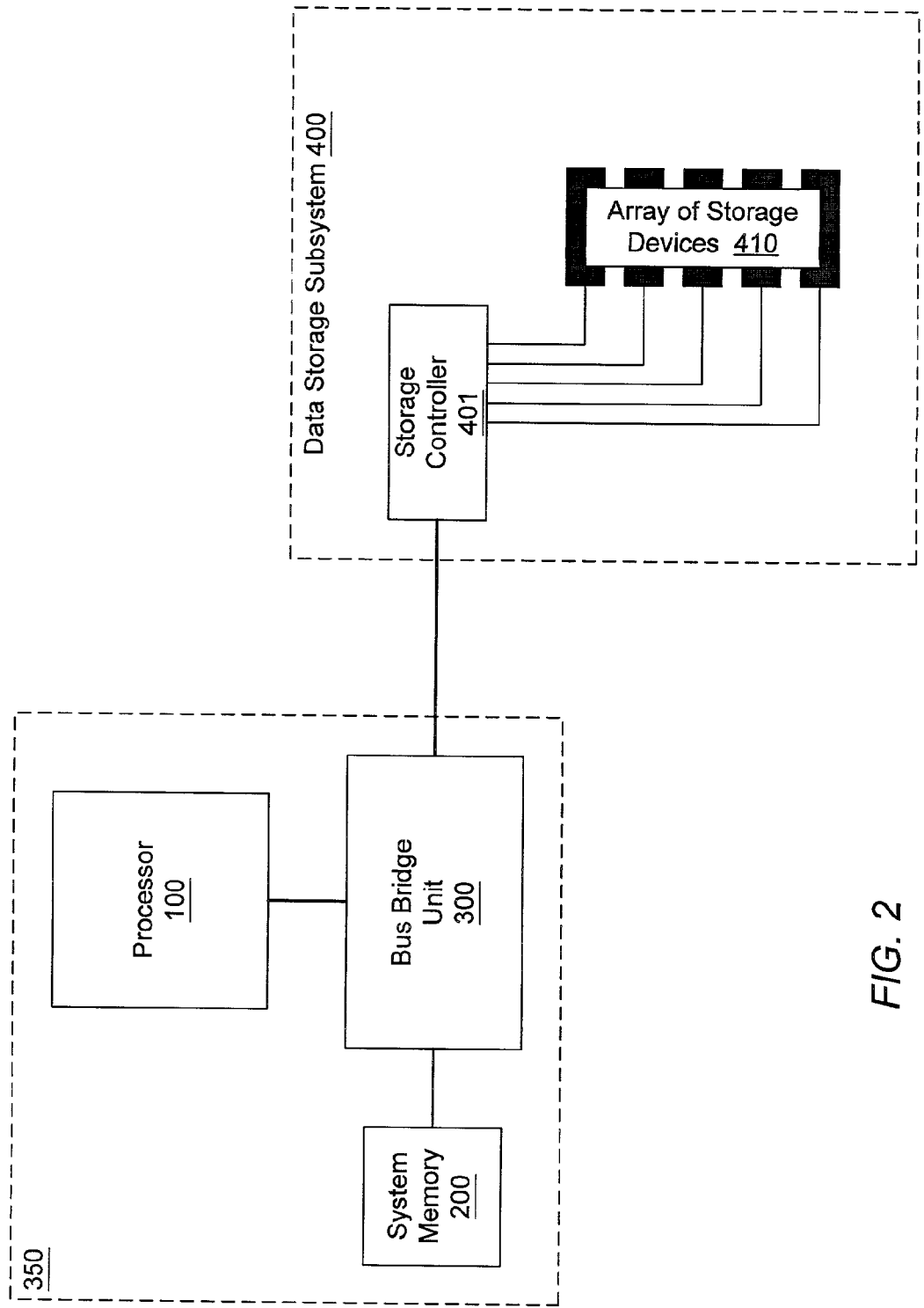
FIG. 2 is a block diagram of one embodiment of a computer system including a data storage subsystem.

Referring now to FIG. 2, a block diagram of one embodiment of a computer system including a data storage subsystem is shown. The computer system includes a main processor 100 coupled to a bus bridge unit 300. Bus bridge unit 300 is also shown coupled to a system memory 200 and to a data storage subsystem 400. Processor 100, system memory 200 and bus bridge unit 300 collectively illustrate components of a host system 350 with which data storage subsystem 400 may be employed.

System memory 200 may be used by processor 100 to temporarily store data and software instructions which need to be accessed rapidly during system operation. Bus bridge 300 may contain hardware to control system memory 200 and interface to data storage subsystem 400. As will be described further below, data storage subsystem 400 includes an array of storage devices 410 which may also store data and software instructions. It is noted that the internal organization of the host 350 of FIG. 2 is illustrative only, and that other specific configurations of hosts with which data storage subsystem 400 may be employed are contemplated.

Figure 3:
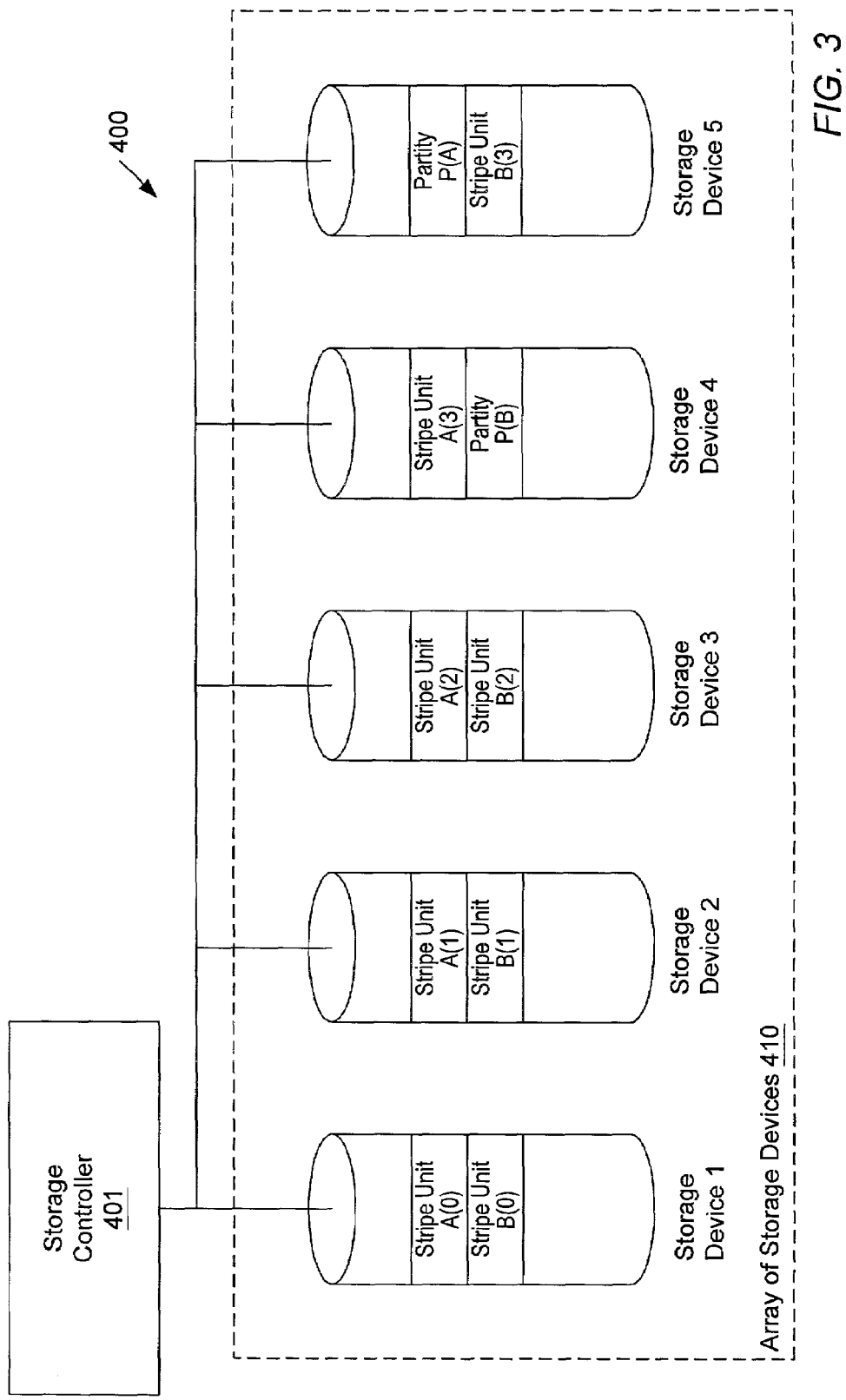
FIG. 3 is a block diagram of a data storage subsystem.

Turning next to FIG. 3, an embodiment of data storage subsystem 400 is shown. System components that correspond to those shown in FIG. 2 are numbered identically for simplicity and clarity. The data storage subsystem 400 of FIG. 3 includes a storage controller 401 coupled to an array of storage devices 410. In this embodiment, array of storage devices 410 includes five storage devices shown as storage device 1 through storage device 5. It is noted that other numbers of storage devices may be employed in other embodiments.

In one embodiment, each of the storage devices 1 through 5 is a disk drive. For example, each of the storage devices 1 through 5 may be a SCSI (Small Computer Systems Interface) compliant disk drive, and EIDE (Extended Integrated Device Electronics) compliant disk drive, or a Fibre Channel compliant disk drive. Storage devices of other types such as tape drives may be employed in other embodiments.

Figure 1:
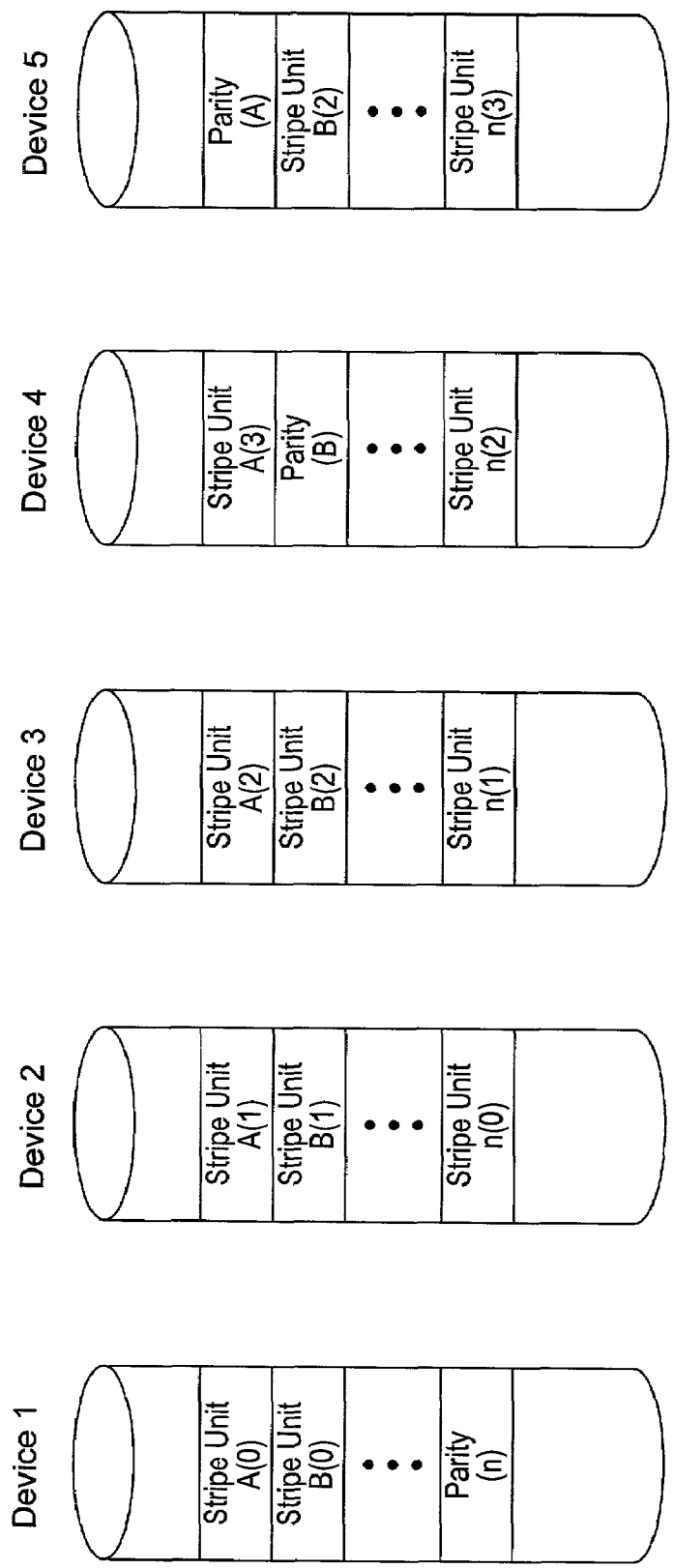
FIG. 1 is a diagram of one embodiment of a conventional RAID 5 storage arrangement.

During operation, when processor 100 of FIG. 2 writes data to data storage subsystem 400, storage controller 401 is configured to separate the data into blocks and distribute the blocks across the array of storage devices 410, similar to the manner shown in FIG. 1 and described in the description of a RAID 5 system in the background section. For example, a parity block P(A) is computed for a set of 'A' data blocks and the result of the data write is shown in FIG. 3. The data has been divided into four data blocks, A(0) through A(3) and is stored on storage devices 1 through 4, respectively, in separate stripe units. A parity data block P(A) is stored in storage device 5. The four data blocks A(0) through A(3) and associated parity block P(A) collectively form a stripe. Additional stripes such as the stripe formed by data blocks B(0) through B(3) and the associated parity block P(B), as illustrated, may similarly be stored within the array of storage devices 410 by storage controller 401. As used herein, a data block is a collection of data bits. In addition, as used herein, a stripe is a grouping of data blocks including one or more redundancy data blocks for the grouping (e.g., a parity data block) stored across two or more devices of the array. Each data block of a stripe is referred to as a stripe unit.

Storage controller 401 may read data from array of storage devices 410 by issuing appropriate commands to the storage device(s) upon which a particular block(s) of data resides. It is possible that during such read operations, an error may be detected. For example, a storage device may signal that a media failure has occurred due to an inability to read the requested data from an underlying disk. Alternatively, an error may be detected by way of error detection codes such as checksums which may be associated with the data blocks stored on disk. In the event that such an error occurs, storage controller 401 may advantageously be configured to read the remaining data blocks of the associated stripe including the redundancy data block(s) and, using known techniques, rebuild the irretrievable or erroneous data block. In the case as illustrated where the redundancy block is in the form of parity data, the parity data block may be XORed with the remaining data blocks to reconstruct the irretrievable or erroneous data.

As will be described in further detail below, storage controller 401 is further configured to utilize block verification information associated with data blocks stored within the array of storage devices 410 to invoke initialization procedures. By using the block verification information associated with the data blocks, complete initialization of the array of storage devices 410 may not be required prior to utilization of the array for normal storage and retrieval operations. Instead, initialization of various stripes associated with array of storage devices 410 may occur at various times throughout normal operation of the storage subsystem to thereby amortize the initialization process. Details regarding specific implementations of such initialization procedures will be provided below.

Figure 4:
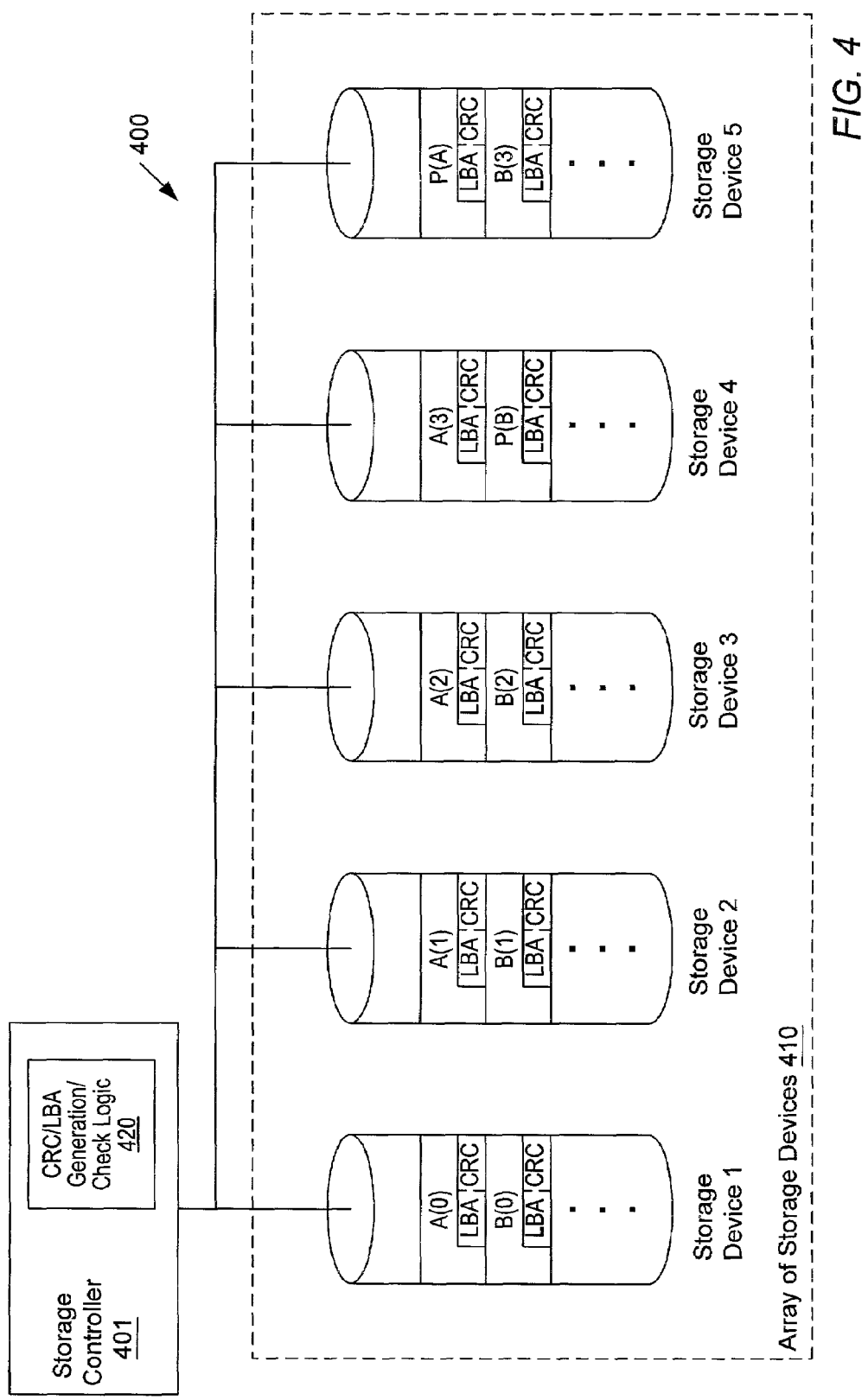
FIG. 4 is a block diagram illustrating an embodiment of the data storage subsystem of FIG. 3.

FIG. 4 is a block diagram that illustrates further details associated with an embodiment of data storage subsystem 400. In the embodiment of FIG. 4, a logical block address (LBA) and a cyclic redundancy check (CRC) code are shown appended to each illustrated data block. The logical block address (LBA) and cyclic redundancy check (CRC) code of each data block are each separate forms of block verification information that may be utilized to determine whether stripe initialization procedures should be invoked, as discussed below.

A CRC/LBA generation/check logic unit 420 is shown embodied within storage controller 401. In one embodiment, the CRC/LBA generation/check logic unit 420 is configured to append the logical block address (LBA) and cyclic redundancy check (CRC) code to each data block prior to storage within the array of storage devices 410.

The logical block address (LBA) is a logical address associated with each block. The logical block address may be unique for a given block, and logical addresses may be contiguous (i.e., sequential) across the array, except at Logical Unit (LUN) boundaries. For a given transfer, software executing within the host system may communicate to storage controller 401 a logical block address indicating a starting point for the transfer as well as a block count associated with the transfer. The storage controller 401 may translate logical block addresses identified in transfer requests from host 350 into physical addresses associated with particular drives that contain the physical locations corresponding to the request. During write operations, the CRC/LBA generation/check logic unit 420 appends the logical block address corresponding to each data block prior to storage. It is noted that in other embodiments, other addresses (such as a physical device address) or other block identification information verifiable by storage controller 401 for host 350 may be stored with each data block in the place of the logical block address. As used herein, the block verification information associated with a given data block may be any information which may be used to verify that particular data read from the array corresponds to an initialized block that was intended to be read.

In the embodiment illustrated, a cyclic redundancy check code is also appended to each data block by CRC/LBA generation/check logic unit 420. The cyclic redundancy check code may cover both the data contained in that block as well as the logical block address. It is noted that in other embodiments, the cyclic redundancy check code may only cover a portion of the data and/or logical block address with the data block. Similarly, other embodiments are also contemplated which utilize other codes such as checksums or other error detection or correction codes which are generated as a function of the data and/or logical block address of the associated data block.

During a read-modify-write operation, the CRC/LBA generation/check logic unit 420 is configured to read the old data block (i.e., the previous version of the data block as stored in array 410) that corresponds to the new data block to be written and to detect the logical block address and cyclic redundancy check code of the old data block to determine whether the associated stripe has been initialized. This may be achieved by determining that a mismatch exists in the logical block address and/or the cyclic redundancy check code of the old data block. A mismatch in the logical block address occurs when the value in the LBA field of the old data block read from disk does not match the logical block address expected by storage controller 401 (i.e., the logical block address value corresponding to the physical location specified in the read request). Similarly, a mismatch in the cyclic redundancy check code occurs when the value in the CRC field of the old data block does not properly reflect the data (and logical block address, if covered) stored in the data block as read, or the portion thereof that the cyclic redundancy code is intended to cover.

Generally speaking, a mismatch in the block verification information of a particular block exists if at least a portion of the block verification information as stored within the block (e.g., the values stored within designated fields of the data block) does not correspond to an expected value that is determined by or verified by the storage controller or host. For example, in the case of a cyclic redundancy code (or other error detection code), the expected value may be calculated by the storage controller or host based on data within a data block. In other cases, the expected value may be based upon an address used by the storage controller or host to access a data block. In yet other embodiments, the expected value may be based upon a locally stored value (e.g., within a lookup table) that is associated with a given data block.

It is noted that an LBA and/or CRC mismatch (an "LBA/CRC mismatch") may result from, and thus indicate, the fact that the associated stripe has not been initialized (since initialization of the stripe would normally create matching LBA/CRC values for each block of the stripe). Thus, in the event the CRC/LBA generation/check logic unit 420 determines that an LBA/CRC mismatch exists, the storage controller 401 may be configured to initialize the stripe by reading the data blocks of the remaining stripe units forming the stripe, compute a corresponding redundancy data block(s) (e.g., parity data block) for the stripe, and store the new data block and the redundancy data block(s) to the array of storage devices 410. As used herein, a stripe is initialized when the redundant data block(s) (e.g., the parity data block) for the stripe is consistent with the remaining data blocks of the stripe. Further details regarding specific implementations of these operations are provided further below.

Figure 5:
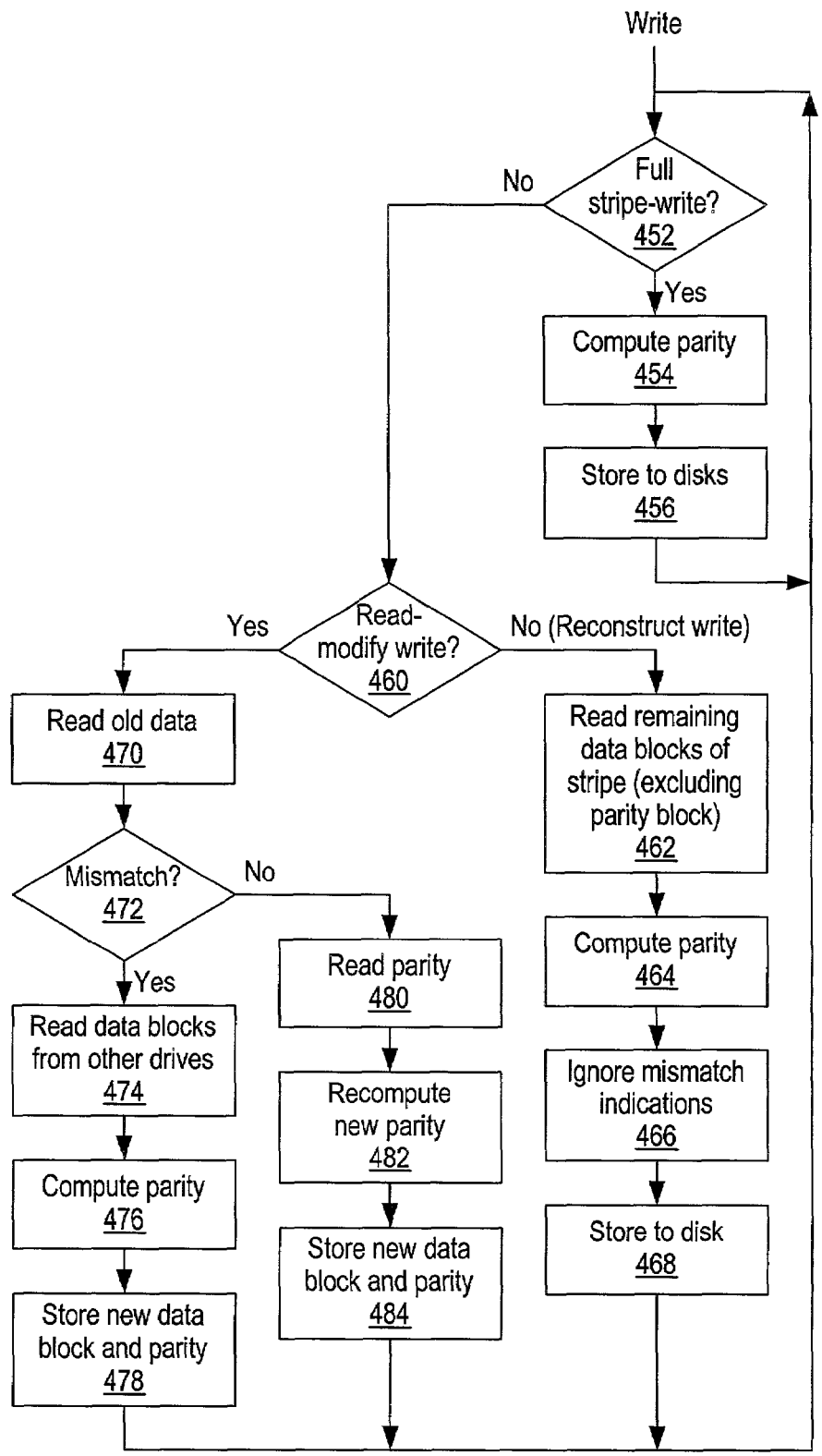
FIG. 5 is a flow diagram illustrating details relating to the operation of an embodiment of a data storage subsystem conforming to the block diagram of FIG. 4.

FIG. 5 is a flow diagram illustrating further details relating to the operation of an embodiment conforming to the general block diagram of FIG. 4. Referring collectively to FIGS. 4 and 5, during operation when storage controller 401 performs a write to a full stripe (step 452) such as a write to data blocks A(0) through A(4), the parity data block (e.g., P(A)) for the stripe is calculated (step 454), and the entire stripe including the parity data block is written to the corresponding locations on storage devices 1–5 (step 456). The CRC/LBA generation/check logic unit 420 may append the appropriate logical block address and cyclic redundancy check code to each data block prior to storage (e.g., the logical block address and cyclic redundancy check code may be stored with the associated data in a data block that is stored as a unit in array 410). It is noted that such an operation creates an initialized stripe, if the stripe was not already initialized.

Storage controller 401 may also be configured to perform certain write operations using a reconstruct write scheme as discussed previously. Such a reconstruct write scheme may be employed if a relatively large number of stripe units of a given stripe are being updated. In this event (step 460), storage controller 401 reads the remaining data blocks of the stripe (step 462), and recomputes a new parity data block based on the data of the stripe units forming the updated stripe (step 464). In this situation, it is noted that the old parity data block need not be read from the array of storage devices 410.

Upon reading the remaining data blocks of the stripe during step 462, the CRC/LBA generation/check logic unit 420 may be configured to detect mismatch conditions associated with the logical block address and/or cyclic redundancy check code of the blocks being read. In one embodiment, mismatch conditions may be communicated by CRC/LBA generation/check logic unit 420 in the form of interrupts to higher level software or firmware executing within storage controller 401 (or host 350). Since a new parity data block is being calculated based on all of the data blocks of the stripe units forming the stripe, any mismatches detected by CRC/LBA generation/check logic unit 420 may be ignored (step 466). During step 468, the new data blocks including the new parity data block are written to the array of storage devices 410 by storage controller 401. Since the newly written parity data block is consistent for the stripe, the stripe becomes initialized (if it was not already). It is noted that prior to writing the updated data blocks to the array of storage devices 410, the CRC/LBA generation/check logic unit 420 is configured to provide a corresponding logical block address and cyclic redundancy check code for each stored data block, if the corresponding information does not already exist. It is also noted that storage controller 401 need not write back any unmodified data blocks stored on disk that already contain a matching logical block address and cyclic redundancy check code.

In other instances, storage controller 401 may be configured to perform a given write operation using a read-modify-write scheme as discussed previously. Such a scheme may be employed, for example, when a relatively small number of stripe units (e.g., such as a single stripe unit) are being updated. In this event (step 460), storage controller 401 reads the old data block(s) that corresponds to the data being updated (step 470). Upon reading the old data block(s), the CRC/LBA generation/check logic unit 420 determines whether the logical block address and/or the cyclic redundancy check code associated with the old data block matches their expected values. For example, when storage controller 401 reads a particular data block, the CRC/LBA generation/check logic unit 420 may compare the value contained in the LBA field of the data block to the logical block address that the storage controller 401 (or host 350) utilized in performing the read to determine if an LBA mismatch exists. If the value of the LBA field of the data block read does not match the logical block address associated with the read operation as performed by storage controller 401, such mismatch may indicate that the associated stripe has not yet been initialized. Similarly, the storage controller 401 may be configured to recompute a cyclic redundancy code for a data block read from storage and compare the recomputed code to the value in the CRC field of the data block. If the value in the CRC field is not consistent with the data of the data block it is intended to cover, such mismatch may also indicate that the associated stripe has not yet been initialized. Accordingly, if a mismatch in the logical block address and/or the cyclic redundancy check code of the data read from storage exists (step 472), storage controller 401 may initiate an initialization procedure for the stripe beginning with step 474 in which the data blocks from the remaining stripe units of the stripe are read, and a new parity data block is computed for the stripe (step 476). Subsequently, the updated data blocks including the updated parity data block are written to the array of storage devices 410 (step 478). It is noted that during this operation, each of the data blocks may need to be updated by CRC/LBA generation/check logic unit 420 with an appropriate logical block address and cyclic redundancy check code appended to match each data block. Following these operations, the parity data block is consistent with respect to the remaining data blocks of the stripe, and the stripe is therefore initialized.

If after the old data block(s) is read during step 470, no mismatch in either the logical block address or cyclic redundancy check code for the data block(s) is indicated by CRC/LBA generation/check logic unit 420 (step 472), a normal read-modify-write operation may be invoked by reading the old parity data block for the stripe (step 480) and recomputing a new parity data block using the old parity data block in conjunction with the old data block and the updated data block (step 482). The updated data block and the new parity data block are stored to the array of storage devices 410 during step 484. Similar to previously described operations, prior to storing the new data block and new parity data block to the array of storage devices 410, the CRC/LBA generation/check logic unit 420 appends an appropriate logical block address and cyclic redundancy check code to each of the blocks being written.

Figure 6:
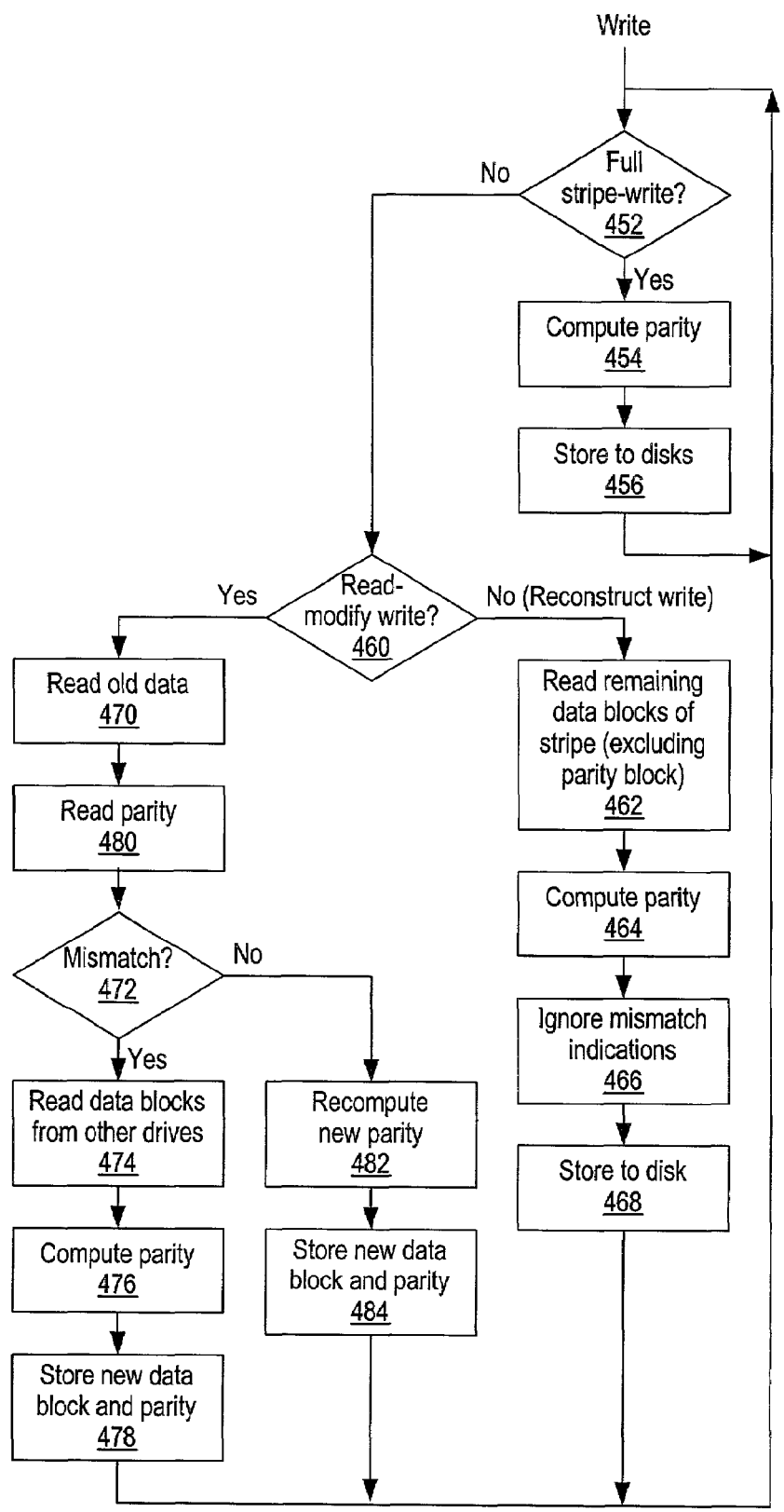
FIG. 6 is a flow diagram illustrating details relating to the operation of another embodiment of a data storage subsystem conforming to the block diagram of FIG. 4.

It is noted that in other embodiments, the performance of particular steps illustrated in FIG. 5 may occur at different times relative to other steps. For example, in the case of a read-modify-write operation, the parity data block for the stripe may be read (step 480 of FIG. 5) prior to determining whether an LBA/CRC mismatch (step 472) exists in the old data block. This variation is illustrated in FIG. 6. While such an embodiment is possible and contemplated, by deferring the read of the parity data block until after determining whether an LBA/CRC mismatch exists in the old data block, unnecessary parity data block read operations may be avoided (that is, in the event an LBA/CRC mismatch is detected).

In addition, it is noted that in yet other embodiments storage controller 401 may be configured to determine whether an LBA/CRC mismatch exists in at least two of the data blocks prior to initiating the initialization procedures of steps 474, 476 and 478. For example, in one embodiment, storage controller 401 reads the old data block being updated during step 470 as well as the parity data block read during step 480 (FIG. 6). The storage controller 401 initiates the initialization procedures of steps 474, 476 and 478 only if LBA/CRC mismatches exist in both the old data block and the parity data block. If only a single data block (such as the old data block) contains an LBA/CRC mismatch, the storage controller 401 may infer that such condition indicates a bit error in one or both of the LBA or CRC fields of the old data block, and may initiate a block error correction procedure as described previously (e.g., by reconstructing the old data block), rather than initiating an initialization procedure for the stripe.

In still other embodiments, the host system (e.g., host 350) may embody the functionality of CRC/LBA generation/check logic unit 420, or portions of its functionality, as described above. The host system may communicate with storage controller 401 regarding a particular CRC and LBA generation and checking scheme and enable the storage controller 412 to utilize the CRC and LBA information for the initialization procedures as described herein. In such embodiments and other embodiments, the embedding of the CRC/LBA information within data blocks may be performed by the host system.

Figure 7:
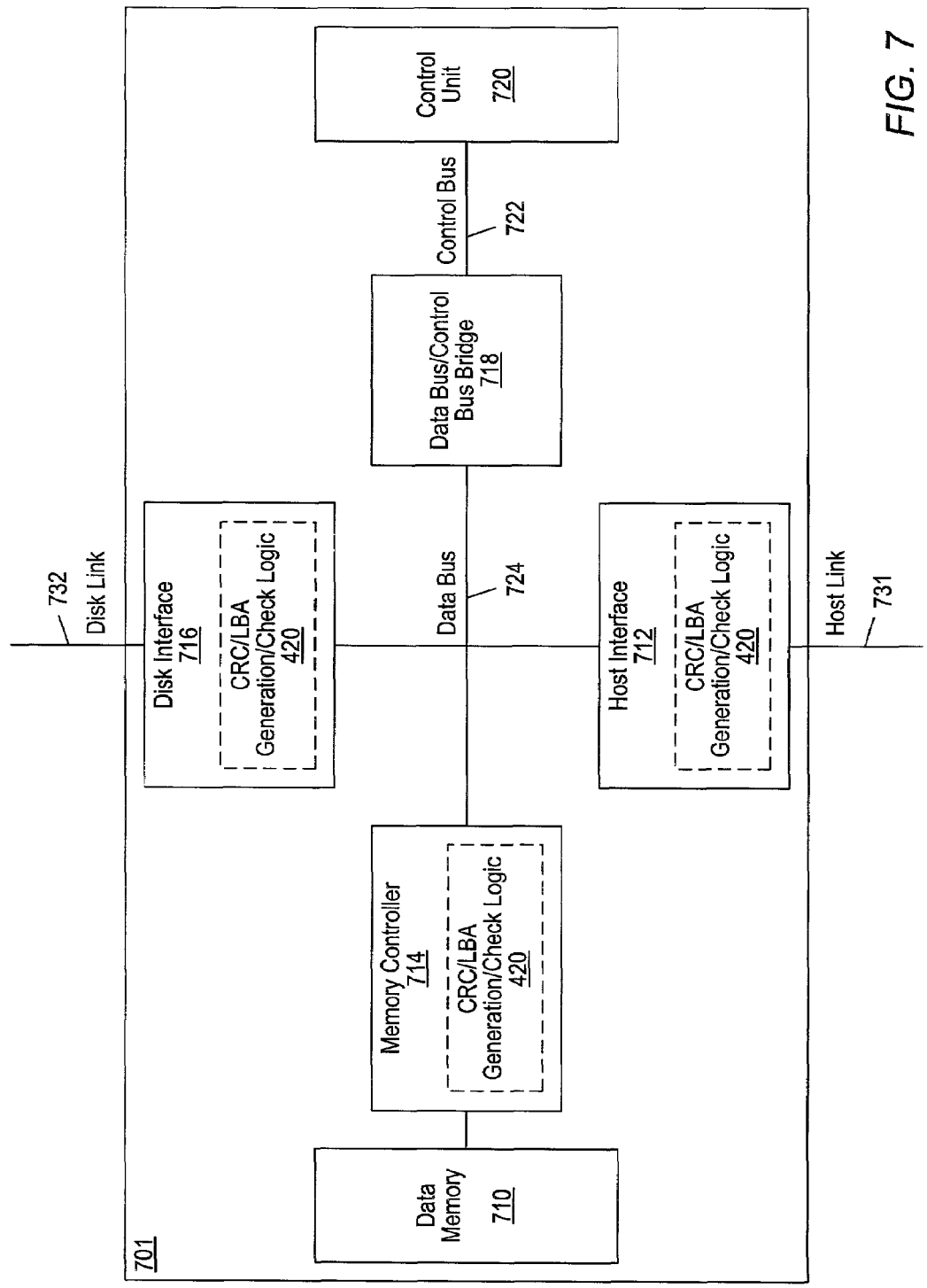
FIG. 7 is a block diagram illustrating internal features of a particular embodiment of a storage controller.

FIG. 7 is a block diagram illustrating particular embodiments of a storage controller 701 that may generally implement the functionality of storage controller 401 as discussed above. The storage controller 401 of FIG. 7 includes a host interface 712 coupled to a memory controller 714, a disk interface 716, and a data bus/control bus bridge 718 through a data bus 724. A data memory 710 is shown coupled to memory controller 714. A control unit 720 is shown coupled to data bus/control bus bridge 718 through a control bus 722.

Storage controller 701 may be connected to one or more host computers through one or more host links 731 (e.g., PCI, Fiber Channel, EIDE, TCP/IP or SCSI buses) coupled to host interface 712. Storage controller 401 may also be connected to one or more storage devices via one or more disk links 732 (e.g., PCI, Fiber Channel, EIDE, or SCSI buses) coupled to disk interface 716. Data is moved from/to the host memory via data memory 710 to/from storage device(s) through host interface 712, memory controller unit 714, and disk interface 716 under general control by control unit 720. For example, a host request to read a particular set of data stored on a storage device(s) connected to disk link 732 may be received from the host through host interface 712. In response to the request, control unit 720 may communicate through data bus/control bus bridge 718 to cause disk interface 716 to read the appropriate block(s) from the underlying storage device(s). As each block is read, it is temporarily stored in data memory 710 by memory controller 714, and is subsequently transferred to the host through host interface 712.

As illustrated in phantom in FIG. 7, the functionality (or portions thereof) of the CRC/LBA generation/check logic unit 420 as described above may be embodied within host interface 712, memory controller 714, and/or disk interface 716. In embodiments where the generation and checking of the CRC/LBA information is implemented within host interface 712, for data arriving from the host, the LBA (which may be, for example, 4 bytes) may be appended to the end of each block (which may be, for example, 512 bytes) and a CRC (which may be, for example, 4 bytes) may be generated across the entire block, including the LBA, and appended to the end of the block. These suffixes to the data are carried across the data bus 724 to the storage devices and stored on them. Upon retrieval of the data, on the way out to the host both the LBA and CRC are verified within host interface 712 and any mismatch may be communicated to the control unit for exception handling. In response to such a mismatch indication, control unit 720 may cause the stripe initialization procedures as described above to be carried out.

A disadvantage of generating and checking the CRC/LBA host interface 712 only is that the internally generated data (e.g., reconstructed data for the failed devices) may not be checked for data integrity until the data is to be delivered to host. Such a delayed checking might result in unnecessary data loss. Checking the CRC/LBA information within either the disk interface 716 or memory controller 714 unit can alleviate this problem. However, not checking the CRC/LBA information within the host interface 712 may have the disadvantage of not covering longitudinal errors on the data bus 724 or errors which may be introduced by host interface 712. Accordingly, improved fault tolerance may be achieved by checking the LBA/CRC information within host interface 712 and either the memory controller 714 or disk interface 716.

Implementing the CRC/LBA generation and checking functionality within memory controller 714 may also be associated with further advantages. Generally dealing with data sizes that are not powers of 2 create software management and/or memory efficiency problems on the memory units. Appending the LBA/CRC information to the end of data blocks that are of sizes of powers of 2, generally create these problems. A memory controller 714 that implements the CRC/LBA generation/checking logic can be programmed to strip off these suffixes to the data on the way into the data memory 710 and regenerate the information on the way out. Overlooking possible firmware errors, this can be acceptable, since the memory is generally protected by ECC.

It is noted that while the embodiments discussed above with reference to FIGS. 4 and 5 implement a RAID 5 array definition, other embodiments are possible that employ other array configurations or definitions, such as RAID 4 or RAID 6, among others. In addition, while the redundancy block discussed in the implementation of FIGS. 4 and 5 took the form of a parity data block, other embodiments are contemplated that employ different forms of redundancy information.

It is further noted that other specific steps (rather than implementing steps 474, 476 and 478 of FIG. 5) are contemplated for initializing a stripe. For example, in one embodiment, when storage controller 401 determines during a read-modify-write operation that stripe initialization should be invoked, storage controller 401 may be configured to write the new data block and a known pattern (such as all "0's") to the remaining data blocks (rather than reading the old data blocks), along with a consistent parity data block for the newly written stripe.

It is finally noted that other forms of block verification information are possible in other embodiments. For example, block IDs may be used rather or in addition to logical block addresses and/or cyclic redundancy check codes. Similarly, other error detection codes may be utilized, such as Hamming codes, to serve the purposes of the block verification information described above. In addition, other embodiments are contemplated in which the block verification information, such as CRC/LBA information, associated with particular data blocks is stored separate from the data blocks in the array 410, or within a completely different storage mechanism (i.e., rather than appending the verification information within each data block).

In various embodiments, additional mechanisms or methodologies may be employed to distinguish between an uninitialized stripe and a hardware/software error resulting in an LBA/CRC mismatch. In addition, storage controller 401 may be configured via diagnostics or other methods to ensure that the data paths and the CRC/LBA generation/check logic are free of errors before allowing stripes to be initialized.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data storage subsystem comprising:
   a plurality of storage devices;
   a storage controller coupled to said plurality of storage devices, wherein said storage controller is configured to store data in the form of stripes where each stripe includes a plurality of data blocks stored across said plurality of storage devices, wherein each stripe further includes a redundancy data block;
   wherein said storage controller is further configured to initialize a given stripe in response to receiving a write request to write a new data block at a particular location of said given stripe and detecting a mismatch in block verification information associated with an existing data block at the particular location of said given stripe to be updated;
   wherein, to detect a mismatch in block verification information associated with the existing data block at the particular location of said given stripe to be updated, said storage controller is configured to read the existing data block and a corresponding block verification information, generate a recomputed block verification information from data within the existing data block, and compare the corresponding block verification information to the recomputed block verification information to determine whether a mismatch exists;
   wherein said storage controller is configured to initialize said given stripe by generating a corresponding redundancy data block for said given stripe based on at least the new data block to be written to said given stripe.

2. The data storage subsystem as recited in claim 1 wherein said storage controller is configured to initialize said given stripe by reading one or more remaining data blocks of said given stripe and generating the corresponding redundancy data block for said given stripe based on the remaining data blocks and the new data block.

3. The data storage subsystem as recited in claim 1 wherein said redundancy data block contains parity data calculated from said other data blocks.

4. The data storage subsystem as recited in claim 1 wherein said block verification information associated with a particular data block includes a code dependent upon data contained within said particular data block.

5. The data storage subsystem as recited in claim 4 wherein said code is an error detection code.

6. The data storage subsystem as recited in claim 5 wherein said error detection code is a cyclic redundancy check code.

7. The data storage subsystem as recited in claim 5 wherein said storage controller is configured to detect a mismatch in said block verification information by comparing a value contained in a field of said particular data block for storing said error detection code to a recomputed error detection code computed from data within said particular data block read from one of said storage devices.

8. The data storage subsystem as recited in claim 1 wherein said block verification information associated with a particular data block includes an address associated with said particular data block.

9. The data storage subsystem as recited in claim 8 wherein said address is a logical block address for said particular block.

10. The data storage subsystem as recited in claim 9 wherein said storage controller is configured to detect a mismatch in said block verification information by comparing a value contained in a field of said particular data block for storing said logical block address to an expected value of said logical block address for said particular data block read from one of said storage devices.

11. The data storage subsystem as recited in claim 8 wherein said block verification information of said particular data block further includes a code dependent upon data contained within said particular data block.

12. The data storage subsystem as recited in claim 11 wherein said code is an error detection code.

13. The data storage subsystem as recited in claim 12 wherein said error detection code is a cyclic redundancy check code.

14. The data storage subsystem as recited in claim 1 wherein each of said plurality of storage devices is a disk drive.

15. The data storage subsystem of claim 1 wherein said block verification information includes a block ID.

16. The data storage subsystem of claim 1 wherein said storage controller is configured to implement RAID 5 functionality.

17. The data storage subsystem as recited in claim 1 wherein said storage controller is configured to initialize said given stripe by generating the corresponding redundancy data block for said given stripe based on the new data block and a known data pattern to be written to said given stripe at memory locations corresponding to one or more remaining data blocks of said given stripe.

18. The data storage subsystem as recited in claim 17 wherein the known data pattern is a pattern of all zeros.

19. The data storage subsystem as recited in claim 1 wherein block verification information is associated with each of the plurality of data blocks and the redundancy data block.

20. The data storage subsystem as recited in claim 1 wherein said storage controller is configured to initialize one or more stripes in said data storage subsystem depending upon whether write requests are received that correspond to the one or more stripes and depending upon whether a mismatch is detected in the block verification information associated with each of the one or more stripes.

21. The data storage subsystem as recited in claim 1 wherein said storage controller is configured to initialize a subset of said stripes in said data storage subsystem in response to receiving a write request to write a new data block in each of the subset of said stripes and in response to detecting a mismatch in block verification information associated with each of the subset of said stripes, and subsequent to initializing the subset of said stripes, initializing one or more remaining stripes in said data storage subsystem in response to receiving a write request to write a new data block in each of the one or more remaining stripes and in response to detecting a mismatch in block verification information associated with each of the one or more remaining stripes.

22. A data storage subsystem comprising:
   a plurality of storage devices;
   a storage controller coupled to said plurality of storage devices, wherein said storage controller is configured to store data in the form of stripes where each stripe includes a plurality of data blocks stored across said plurality of storage devices, wherein at least one of the plurality of data blocks is a redundancy data block;
   wherein said storage controller is further configured to initialize a given stripe in response to receiving a write request to write a new data block at a particular location of said given stripe and detecting a mismatch in block verification information in each of at least two existing data blocks of said given stripe, wherein one of the two existing data blocks is at the particular location of said given stripe to be updated;
   wherein, to detect a mismatch in block verification information associated with the one existing data block at the particular location of said given stripe to be updated, said storage controller is configured to read the one existing data block and a corresponding block verification information, generate a recomputed block verification information from data within the one existing data block, and compare the corresponding block verification information to the recomputed block verification information to determine whether a mismatch exists;
   wherein said storage controller is configured to initialize said given stripe by generating a corresponding redundancy data block for said given stripe based on at least the new data block to be written to said given stripe.

23. The data storage subsystem as recited in claim 22 wherein said storage controller is configured to initialize said given stripe by reading one or more remaining data blocks of said given stripe and generating the corresponding redundancy data block for said given stripe based on the remaining data blocks and the new data block.

24. The data storage subsystem as recited in claim 22 wherein said redundancy data block contains parity data calculated from said other data blocks.

25. The data storage subsystem as recited in claim 22 wherein said block verification information of a particular data block includes a code dependent upon data contained within said particular data block.

26. The data storage subsystem as recited in claim 25 wherein said code is an error detection code.

27. The data storage subsystem as recited in claim 26 wherein said error detection code is a cyclic redundancy check code.

28. The data storage subsystem as recited in claim 26 wherein said storage controller is configured to detect a mismatch in said block verification information by comparing a value contained in a field of said particular data block for storing said error detection code to a recomputed error detection code computed from data within said particular data block read from one of said storage devices.

29. The data storage subsystem as recited in claim 22 wherein said block verification information of a particular data block includes an address associated with said particular data block.

30. The data storage subsystem as recited in claim 29 wherein said address is a logical block address for said particular block.

31. The data storage subsystem as recited in claim 30 wherein said storage controller is configured to detect a mismatch in said block verification information by comparing a value contained in a field of said particular data block for storing said logical block address to an expected value of said logical block address for said particular data block read from one of said storage devices.

32. A computer system comprising:
   a host; and
   a data storage subsystem coupled to said host, said data storage subsystem including:
      a plurality of storage devices;
      a storage controller coupled to said plurality of storage devices, wherein said storage controller is configured to store data in the form of stripes where each stripe includes a plurality of data blocks stored across said plurality of storage devices, wherein each stripe further includes a redundancy data block;
      wherein said storage controller is further configured to initialize a given stripe in response to receiving a write request to write a new data block at a particular location of said given stripe and detecting a mismatch in block verification information associated with an existing data block at the particular location of said given stripe to be updated;
      wherein, to detect a mismatch in block verification information associated with the existing data block at the particular location of said given stripe to be updated, said storage controller is configured to read the existing data block and a corresponding block verification information, generate a recomputed block verification information from data within the existing data block, and compare the corresponding block verification information to the recomputed block verification information to determine whether a mismatch exists;
      wherein said storage controller is configured to initialize said given stripe by generating a corresponding redundancy data block for said given stripe based on at least the new data block to be written to said given stripe.

33. The computer system as recited in claim 32 wherein said storage controller is configured to initialize said given stripe by reading one or more remaining data blocks of said given stripe and generating the corresponding redundancy data block for said given stripe based on the remaining data blocks and the new data block.

34. The computer system as recited in claim 32 wherein said redundancy data block contains parity data calculated from said other data blocks.

35. The computer system as recited in claim 32 wherein said block verification information associated with a particular data block includes an error detection code.

36. The computer system as recited in claim 35 wherein said block verification information of a particular data block further comprises an address associated with said particular data block.

37. A method of operating a data storage subsystem comprising:
- storing data in the form of stripes within a plurality of storage devices, where each stripe includes a plurality of data blocks stored across said plurality of storage devices, wherein each stripe further includes a redundancy data block; and
- initializing a given stripe in response to receiving a write request to write a new data block at a particular location of said given stripe and detecting a mismatch in block verification information associated with an existing data block at the particular location of said given stripe to be updated;
- wherein said detecting a mismatch in block verification information associated with the existing data block at the particular location of said given stripe to be updated includes reading the existing data block and a corresponding block verification information, generating a recomputed block verification information from data within the existing data block, and comparing the corresponding block verification information to the recomputed block verification information to determine whether a mismatch exists;
- wherein said initializing said given stripe comprises generating a corresponding redundancy data block for said given stripe based on at least the new data block to be written to said given stripe.

38. The method as recited in claim 37 wherein said initializing said given stripe comprises reading one or more remaining data blocks of said given stripe and generating the corresponding redundancy data block for said given stripe based on the remaining data blocks and the new data block.

39. The method as recited in claim 37 wherein said redundancy data block contains parity data calculated from said other data blocks.

40. The method as recited in claim 37 wherein said block verification information of a particular data block includes an error detection code.

41. The method as recited in claim 40 wherein said block verification information associated with said particular data block further includes an address associated with said particular data block.

42. The method as recited in claim 40 wherein said detecting said mismatch in said block verification information comprises comparing a value contained in a field of said particular data block for storing said error detection code to a recomputed error detection code computed from data within said particular data block read from one of said storage devices.

43. The method as recited in claim 37 wherein said block verification information associated with a particular data block includes an address associated with said particular data block.

44. The method as recited in claim 43 wherein said detecting said mismatch in said block verification information comprises comparing a value contained in a field of said particular data block for storing said address to an expected value of said address for said particular data block read from one of said storage devices.

45. A method of operating a data storage subsystem comprising:
- storing data in the form of stripes within a plurality of storage devices, where each stripe includes a plurality of data blocks stored across said plurality of storage devices, wherein each stripe further includes a redundancy data block;
- receiving a write request to write a new data block at a particular location of a given stripe; and
- initializing said given stripe in response to receiving the write request and detecting a mismatch in block verification information associated with an existing data block at the particular location of said given stripe to be updated;
- wherein said detecting a mismatch in block verification information associated with the existing data block at the particular location of said given stripe to be updated includes reading the existing data block and a corresponding block verification information, generating a recomputed block verification information from data within the existing data block, and comparing the corresponding block verification information to the recomputed block verification information to determine whether a mismatch exists;
- wherein said initializing said given stripe comprises generating a corresponding redundancy data block for said given stripe based on at least the new data block to be written to said given stripe.

* * * * *